J. H. THOMPSON.
SUPPORT FOR ENDLESS TRACKS.
APPLICATION FILED SEPT. 2, 1919.
1,390,473.
Patented Sept. 13, 1921.
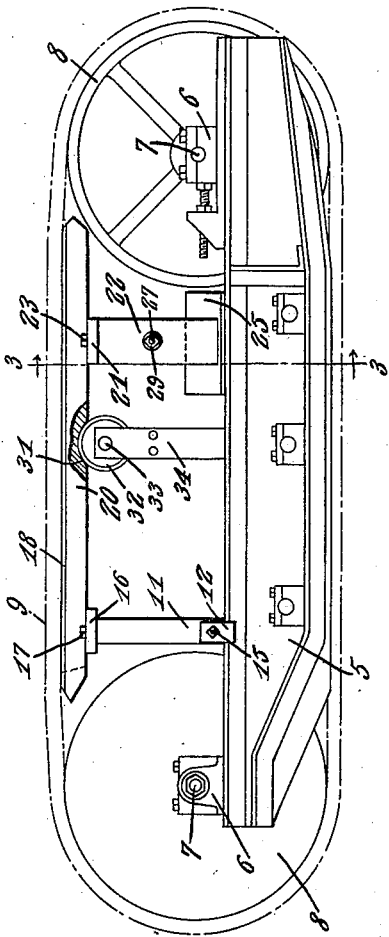
Witness
Inventor
J.H.Thompson,
By C.A.Snow & Co.
Attorneys

UNITED STATES PATENT OFFICE.

JAMES H. THOMPSON, OF HARRISONVILLE, MISSOURI.

SUPPORT FOR ENDLESS TRACKS.

1,390,473.     Specification of Letters Patent.     Patented Sept. 13, 1921.

Application filed September 2, 1919. Serial No. 321,061.

*To all whom it may concern:*

Be it known that I, JAMES H. THOMPSON, a citizen of the United States, residing at Harrisonville, in the county of Cass and State of Missouri, have invented a new and useful Support for Endless Tracks, of which the following is a specification.

This invention has reference to tractor construction, and more particularly to tractor construction of the creeper type.

The important feature of the present invention is to provide means disposed between the wheels of each side of the tractor, for supporting the endless chain driving element, at this point, thereby eliminating unnecessary vibrations of the driving element, and consequently preventing whipping thereof, relative to the tractor, and relieving the tractor of undue vibrations, which rapidly wear out the bearings and supporting elements of the machine.

A further object of the invention is to provide means for adjusting the support with relation to the frame, to accommodate the support to various degrees of slack, prevalent in the driving element.

With these and other objects in view, which will appear as the description proceeds, the invention consists in the novel construction and combination of parts, all of which will be more fully described hereinafter, and finally pointed out in the claims, it being understood that certain changes may be made within the scope of the invention.

Referring to the drawing:—

Figure 1 illustrates a side elevational view of a tractor frame, showing my invention applied thereto, the endless driving element being shown in dot and dash lines.

Fig. 2 illustrates an end elevational view of my invention, and

Fig. 3 illustrates a sectional view taken on line 3—3 of Fig. 1.

Having reference to the drawing in detail, the reference character 5 designates one of the side members of the tractor frame, which is of the usual construction, and is provided with the upwardly extending bearing members 6, disposed at opposite ends thereof, which bearings support the usual shafts 7, on which operate the supporting wheels 8, and over which operates the endless driving element 9, employed in the usual construction, of creeper tractors.

The device, forming the subject matter of the present invention, includes the upwardly extending arms 10 and 11, which are provided near their lower ends with the clamping plates 12 and 13, arranged in pairs, and secured to the respective arms 10 and 11, by means of the bolts 14 and 15, passing through the arms.

The upper ends of the arms 10 and 11, have connection with the cross arm 16, the same being secured thereto by means of the bolts 17, passing through the cross arm 16, and extending into the openings formed in the upper ends of the arms 10 and 11.

As shown, the trough or supporting surface of the invention includes the upwardly extending arms 18 and 19, disposed at opposite sides of the base 20, which has connection with the cross arm 16, near the forward end thereof, the rear end thereof having connection with the cross arm 21, which is bolted to the adjusting arms 22, as at 23. These adjusting arms 22, extend downwardly and terminate at points above the upper edge of the frame 5, and have their inner lower ends beveled as at 24, which beveled ends are supported on the inverted V-shaped member 25, which is also secured to the upper surfaces of the frame 5, by means not shown.

Disposed substantially centrally of each of the adjusting arms 22, is an aperture 26, which apertures 26 as shown, are in alinement with each other to receive the threaded bolt 27, having its ends provided with nuts 28 and 29, adapted to engage the outer side faces of the adjusting arms 22, while the nuts 30, which are disposed on the threaded portion of the bolt 27, engage the inner faces of the arms 22, for holding the adjusting arms in their positions of adjustment.

From the foregoing it will be seen that in the event that the creeper, or driving element 9 becomes slack, the nuts 30, are loosened, and the nuts 29, are tightened, with the result that the adjusting arms 22, are moved toward each other, it following that the beveled portions of the arms 22, move upwardly on the inverted V-shaped member 25, consequently, taking up the slack on the driving element 9.

It might be further stated that the base 20, is provided with a cut-out portion 31, to provide a clearance for the idle pulley 32, supported on the shaft 33, which in turn is supported in suitable bearings formed in the upwardly extending arms 34, the idle pulley being for the purpose of supporting the creeper when the support is removed.

It is obvious, from the foregoing that the entire length of creeper, between the upper edges of the wheel 8, is supported by the frame of the machine, through the medium of the support forming the subject matter of the invention, the weight of this length of creeper, or driving element 9, being thereby removed from the wheels, which weight of the sagging chain, usually causes the bearings to wear out rapidly.

Having thus described the invention, what is claimed is:—

1. In combination with the frame of a creeper tractor and the supporting wheels and endless driving element thereof, a support for the upper portion of the endless driving element, said support including a trough like member, over which the endless driving element operates, an inverted V-shaped member secured to the frame, spaced supporting arms having their upper ends connected with the trough like member, the lower ends thereof engaging the inverted V-shaped member, and means carried by the arms for causing the lower ends of the arms to move over the inverted V-shaped member for causing a vertical adjustment of the trough like member.

2. In combination with the frame of a creeper tractor, and the supporting wheels, and endless driving element, thereof, means for supporting the upper central portion of the endless driving element, said means including a relatively long support, arms for connecting the forward end of the support to the frame, arms for connecting the rear end of the support to the frame, the latter arms having lower beveled edges, means carried by the frame for contacting with the lower beveled edges, and means carried by the last mentioned arms for moving the lower beveled edges over the contacting means carried by the frame for causing a vertical adjustment of the support.

3. In combination with the frame of a creeper tractor, and the supporting wheels and endless driving element thereof, means for supporting the central upper portion of the endless driving element, said means including a support, arms for connecting the forward end of the support to the frame, inclined walls supported by the frame, arms having connection with the supporting means, the lower ends of said arms being inclined and positioned on the inclined walls of the means supported by the frame, and a bolt connecting the arms for moving the arms toward and away from each other to cause the support to be moved with relation to the frame.

In testimony that I claim the foregoing as my own, I have hereto affixed my signature in the presence of two witnesses.

JAMES H. THOMPSON.

Witnesses:
LESLIE A. BRUCE,
ALLAN W. BIRD.